Oct. 23, 1934.  W. R. LINDEN  1,977,640
WELDING AND CUTTING APPARATUS
Filed July 29, 1932   2 Sheets-Sheet 1
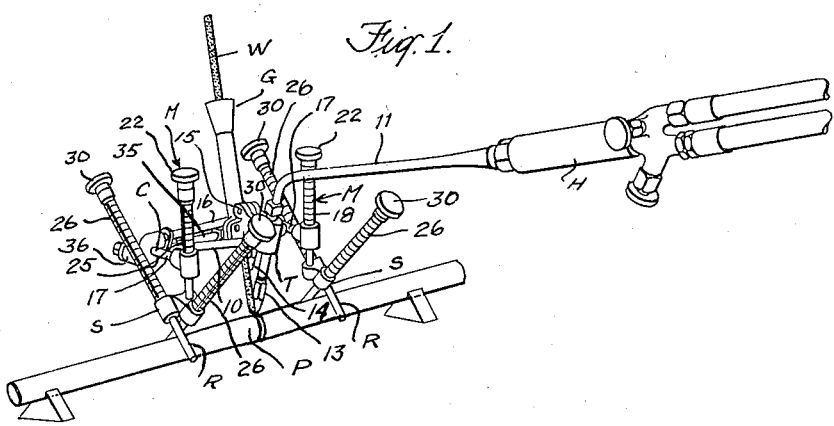
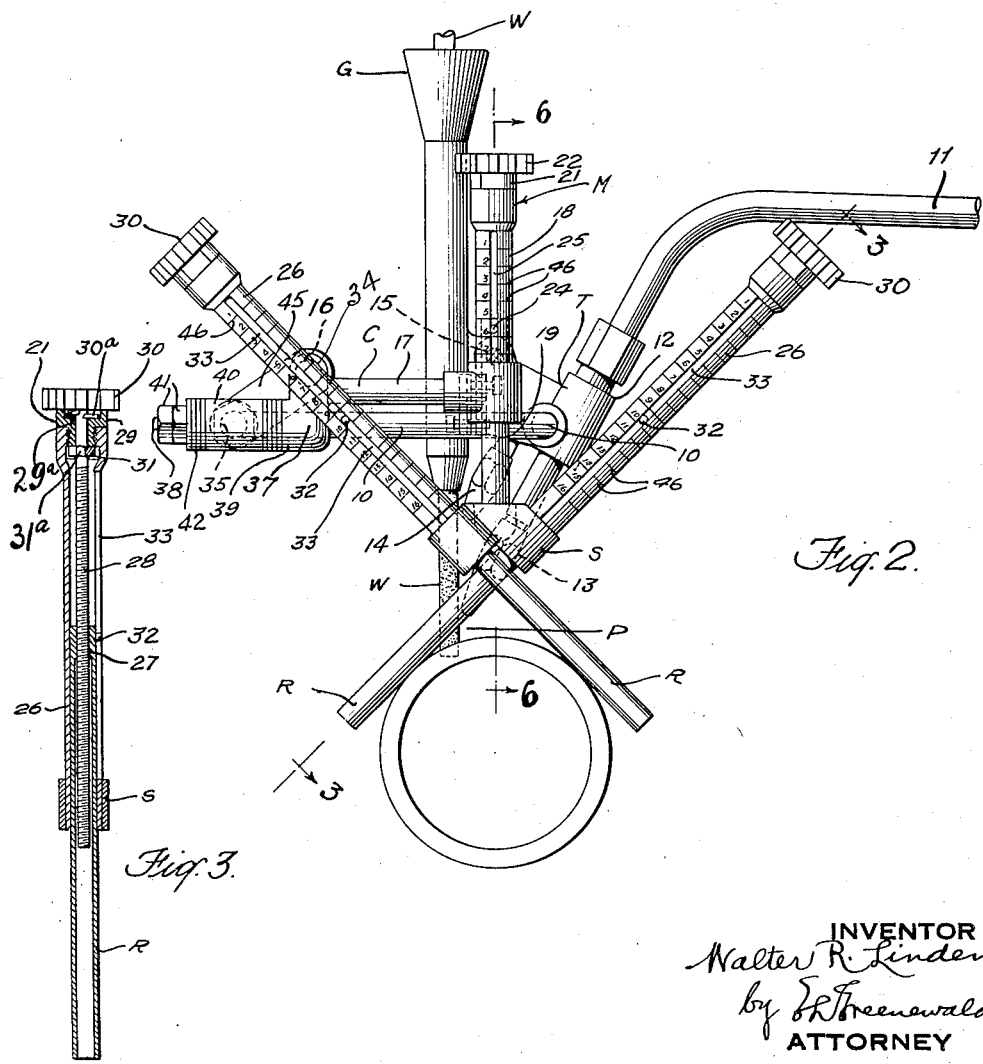
INVENTOR
Walter R. Linden
by F. R. Freenewald
ATTORNEY Oct. 23, 1934.   W. R. LINDEN   1,977,640
WELDING AND CUTTING APPARATUS
Filed July 29, 1932    2 Sheets-Sheet 2
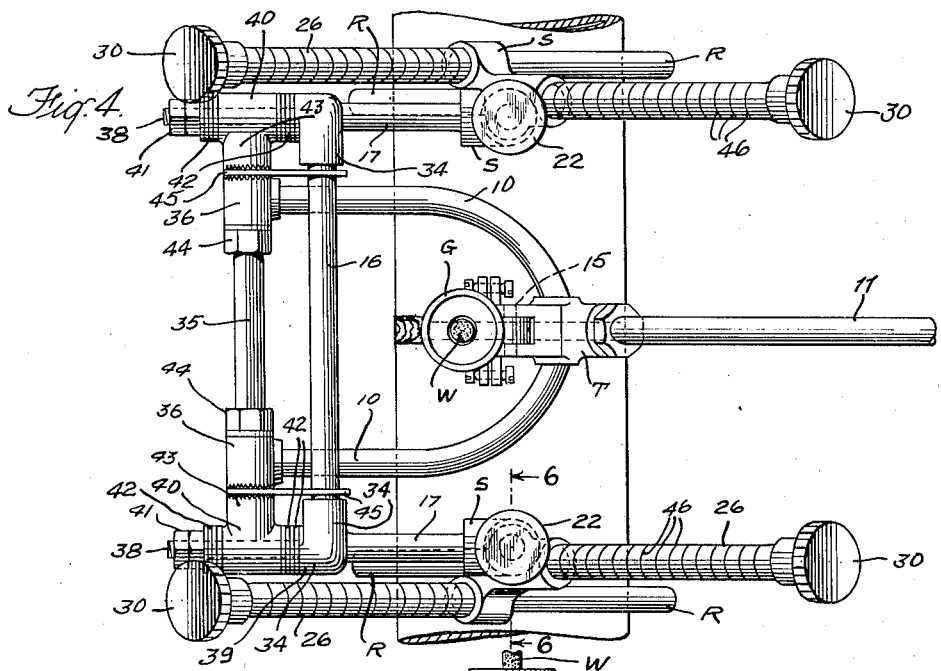
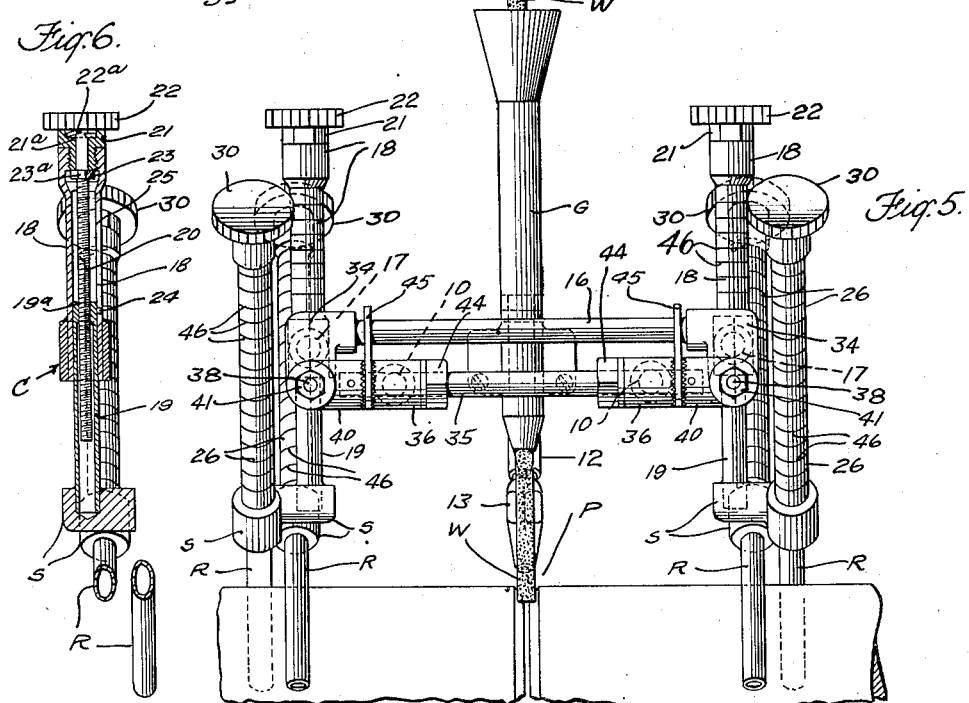
INVENTOR
Walter R. Linden
by E. L. Freenewald
ATTORNEY Patented Oct. 23, 1934

1,977,640

UNITED STATES PATENT OFFICE 1,977,640

WELDING AND CUTTING APPARATUS

Walter R. Linden, Palisades Park, N. J., assignor to The Linde Air Products Company, a corporation of Ohio Application July 29, 1932, Serial No. 625,624

14 Claims. (Cl. 266—23)

This invention relates to welding and cutting apparatus and more particularly to that kind of apparatus adapted for hand operation in the welding of seams between metallic members or in severing metal along a line.

The invention is especially applicable to the type of hand operated apparatus disclosed in the copending application of R. J. Kehl, Ser. No. 576,895, filed November 23, 1931, in which there is provided a carriage adapted to rest in stable equilibrium upon a work surface while being drawn thereover in welding a seam and which is provided with a blowpipe pivotally connected to the carriage for manipulatory angular movement in regulating the fluidity of the puddle of molten metal at the welding point.

Heretofore, in this type of apparatus, there has been provided a carriage having runners connected thereto at spaced points on opposite sides of the blowpipe by shanks which have been both angularly and axially adjustable in order that the apparatus may be adapted to various contours of work surfaces and to curved surfaces of different diameters. To this end, the shanks have been threaded into heads so as to be axially adjustable relatively thereto and the heads, in turn, have been pivoted to the carriage to permit of angular adjustment. The shanks have been locked in their positions of axial adjustment by nuts threaded onto the shanks and resting against the heads at the upper and lower ends thereof and the heads have been similarly locked in their positions of angular adjustment by either nuts or bolts. In consequence, special tools have been required for loosening these locking members before and tightening them after each adjustment of the runners which operations consume time and, in addition, have necessitated removal of the apparatus from the work and extinguishing of the blowpipe flame before an adjustment can be made.

Under certain circumstances it is desirable to adjust the runners while they are resting on the work in order that the operator may judge with his eye as to the amount of adjustment required and under such circumstances it is also desirable that the entire adjustment of each adjustable member of the apparatus be capable of accomplishment by a single simple movement that does not necessitate removal of the apparatus from the work, extinguishing of the flame or the use of tools. It is particularly desirable that all angular adjustments should be eliminated.

It is desirable under other circumstances, that the apparatus be capable of accurate and sometimes very fine adjustment prior to being placed on a work surface, as where a weld is to be made between cylindrical objects of known difference in diameter or where a cut is to be made adjacent a shoulder of known height. Apparatus of the above character, has not, heretofore, been adapted to fine or accurate adjustment either when resting upon or before being placed on the work and adjustments both axial and angular have been largely a matter of guess work so that the operator has had to be content, in many cases, with a crude approximation to the adjustment desired.

Also, with apparatus of this character, and particularly in welding operations, it is desirable that the flame be always projected onto the work at the most effective angle for rapidly melting the rod into the puddle and for maintaining the puddle at the desired fluidity and that the angle should be such that the flame will not blow the molten metal out of the puddle. Therefore, since, as is well known, skill and speed in welding depends largely on habits of the operator acquired in handling and manipulating a given apparatus over a long period of time, it is of advantage that the level of the pivotal support of the blowpipe should be the same when the apparatus is in operation regardless of any adjustments that may be made of the runners in accommodating them to variations in contour of work surfaces upon which the apparatus is employed. Under such conditions the subconscious actions of the operator may usually be depended upon to keep the flame in its most effective position.

It is also desirable that the several runners on each side of the blowpipe be adjustable simultaneously as a unit relative to the carriage and independently of those on the opposite side in order that the runners on one side may be adjusted to rest on a different level of work surface from those on the other side as in welding between pipes of different diameters and that this adjustment may be capable of being made with accuracy and precision before placing the apparatus on the work or may be made with the apparatus resting on the work as may be desired.

Heretofore, in welding and cutting apparatus, no adjustment of the pivotal point between the blowpipe and carriage relative to and independently of adjustments of the runners nor of the simultaneous adjustment of the runners on one side of the blowpipe relative to those on the other side has been provided for.

It is therefore an object of this invention to provide either welding or cutting apparatus, having a carriage and a blowpipe pivotally connected therewith for angular movement relative thereto and supported by runners adapted to rest in stable equilibrium upon objects of various contours and upon curved contours of various diameters and particularly upon such curvatures of comparatively small diameter: in which the runners may be effectively and accurately adjusted by simple movements and without the use of a tool to various sized objects before being placed thereon or while resting upon such objects; in which the runners on one side of the blowpipe may be adjusted simultaneously relative to those on the other side; in which the carriage may be adjusted to the runners independently of any adjustment of the runners so as to be able to position the pivotal connection between the carriage and blowpipe at any desired level regardless of any adjustment of the runners; in which no angular adjustment of the runners to the carriage is required in order to adapt the same to various contours of work; and in which the adjustments of which the apparatus is capable may be made without extinguishing the blowpipe flame.

In accordance with this invention there may be provided, in welding or cutting apparatus, a heating unit as a blowpipe having rearwardly extending arms and a forwardly extending handle; the arms being pivotally connected at their rear end to a carriage which is provided with pairs of crossed runners arranged to straddle a pipe or other similar object and to be adjusted axially with respect to the carriage by suitable means as screws having handwheels thereon so as to adapt them to objects of various diameters. There may also be provided a common support for the runners on each side of the blowpipe, each vertically adjustable with the attached runners as a unit relative to the carriage and independently of the support on the other side of the blowpipe by means operable by hand and without the use of tools.

The above and other objects and novel features of the invention will become apparent from the following specifications taken with the accompanying drawings, in which, Fig. 1 is a perspective view of a blowpipe apparatus showing the same in position on a cylindrical object of small diameter;

Fig. 2 is a view in side elevation of the apparatus on an enlarged scale compared with Fig. 1;

Fig. 3 is a detail view of one of the runners of the apparatus in longitudinal section on line 3—3 of Fig. 2;

Fig. 4 is a plan view of the apparatus;

Fig. 5 is a view of the apparatus in rear elevation; and;

Fig. 6 is a detail view in longitudinal section through one of the carriage adjusting members on line 6—6 of Figs. 2 and 4.

The invention is illustrated in the accompanying drawings as applied to apparatus for use in welding metallic objects together but is equally applicable to cutting apparatus of a similar nature and may be incorporated in a welding or cutting machine or other apparatus with such modifications as may be desirable to adapt the same thereto.

Briefly, the apparatus as shown comprises a blowpipe T having arms 10 rigidly connected therewith and extending rearwardly therefrom; a forwardly extending stem 11 having a handle H connected therewith; a carriage C to which the rear ends of the arms 10 are pivotally connected; runners R connected in pairs to the carriage through supports S on opposite sides of the blowpipe so as to be axially adjustable relative to the supports; and vertically adjustable members M forming a connection between such supports and the carriage C. In welding apparatus, a rod guide G may be provided for guiding the welding rod W to the welding point P on the work, which member may of course be omitted with cutting apparatus.

The stem 11 of the blowpipe T terminates in the usual welding head 12 to which is connected the welding tip 13 and the preheating tip 14; the flame from the welding tip serving to melt the lower end of the rod as it is fed to the welding point and to maintain the welding puddle at this point in a proper condition of fluidity, while that from the preheating tip 14 serves to preheat the rod at a point above the puddle so that it will more readily melt under influence of the flame from the welding tip. The rod guide G is pivoted to the head 12, as shown at 15, so as to be capable of angular adjustment relative thereto in order that factory inaccuracies in the manufacture of these parts may be compensated for in the assembly thereof and is of such construction as to feed the welding rod by gravity into the welding puddle.

The carriage C is comprised of a crossbar 16 and side bars 17 rigidly secured together and the side bars are secured to the supports S by means of members M comprised of telescoping tubular elements 18 and 19 adjustably connected together by screws 20. In this construction, the elements 18 are rigidly secured to the forward ends of the sidebars 17 and the elements 19 to the supports S; elements 19 being slidably received within the bores of elements 18 and held against rotary movement relative thereto by lugs 24 connected to elements 19 and projected into slots 25 formed longitudinally of elements 18 so as to be slidable lengthwise thereof. The screws 20 are mounted in the elements 18 for rotary movement and against axial movement relative thereto by a swivel connection with plugs 21 which are threaded into the upper ends of elements 18. The swivel connection is effected by providing split rings 23 sprung into grooves 23a formed in the shanks of the screws and resting against the lower ends of the plugs in cooperation with heads 22 formed on the upper ends of the screws and resting against the upper ends of the plugs. These heads also serve as turn buttons or hand wheels by means of which the screws may be rotated in effecting adjustment between elements 18 and 19. The shanks of the screws 20 are in threaded connection with the upper ends of the bores of elements 19 as shown at 19a so that rotary movement of the screws will effect axial movement of the elements 19 relatively to elements 18.

It may be noted here, that since the blowpipe is pivotally connected with the carriage, its axis of manipulatory angular movement may be adjusted through elements 18 and 19 to the best position for effectively manipulating the blowpipe flame in controlling the fluidity of the welding puddle or the distance of one of the supports S from the carriage together with the runners carried thereby may be varied relative to that of the other support to adapt the runners on one support to a surface at a different level from that on which the runners connected with the other support rests.

In order that elements 19 may be held against accidental displacement from their adjusted position relative to elements 18, spring washers 22a are provided between heads 22 and the upper ends of plugs 21. These washers are preferably seated in recesses formed in the plugs as shown at 21a and are of such character as to bear against the heads 22 with a force sufficient to effectively prevent accidental turning of the screws without materially resisting the turning thereof in making the desired adjustment.

The runners R are adjustable in a manner similar to elements 19 in order that they may be adapted to various contours of work surfaces and particularly to curved surfaces of various diameters. To this end, there are provided pairs of tubular members or sleeves 26 rigidly secured to each of the supports S so as to diverge from each other at an angle of about 90 degrees. The runners R are also of tubular construction and the bores thereof are provided at their upper ends with threaded portions 27 in engagement with threads of screws 28 swiveled to plugs 29, which latter are threaded into the upper ends of sleeves 26. These screws, like screws 20, are held against axial movement relative to the sleeves by the swivel connections which consist of the heads 30 of the screws resting against the upper ends of the plugs and split rings 31 sprung into grooves 31a in the shanks of the screws and resting against the lower ends thereof. The runners are mounted for axial sliding movement relative to the sleeves and are prevented from rotary movement relative thereto by provision of lugs 32 thereon projected into and sliding lengthwise of slots 33 formed longitudinally of the sleeves 26. The runners R are held against accidental displacement from their adjusted positions in a manner similar to that of members 19, namely, by providing spring washers 30a between heads 30 and plugs 29 and these washers are also seated in recesses 29a formed in the upper ends of the plugs.

The cross bar 16 of carriage C is, preferably slightly elevated above the side bars 17 and to this end is connected with the rear ends of the side bars by elbow members 34. The arms 10 extending rearwardly from the blowpipe, as stated above, are pivoted to a second cross bar 35 constituting a part of the carriage by means of heads 36 on the rear ends of the arms, thus providing for manipulatory angular movement of the arms and blowpipe in a vertical plane for control of the molten metal of the welding puddle when the apparatus is mounted on work. The cross bar 35 is supported below cross bar 16 and rearwardly thereof by elbow members 37 formed integrally with elbow members 34. With this arrangement of the cross bar 16, limited movement of the blowpipe necessary in controlling the puddle is permitted, while, at the same time, the bar constitutes a stop to limit the downward movement of the carriage when the apparatus is lifted off of the work by means of the handle. The bar 35 is connected with elbows 37 by threaded pins 38 extending rearwardly from these elbows 37; the pins being projected through the bores of tubular heads 40 secured on the ends of bar 35 by means of side extensions 43. The heads 40 may be detachably held in place on the pins by means of nuts 41 and a suitable number of washers 42 may be employed to properly position the heads on the pins.

The adjacent ends of the side extensions 43 and the heads 36 may be milled so as to provide a clutching action therebetween when the heads are forced against the ends of the extensions by suitable means as nuts 44. With this construction and by providing the bores of heads 40 with threads, the blowpipe, the handle, arms 10 and bar 35 may be detached as a unit from the carriage C and by attaching suitable runners thereto may be employed in welding operations independently of the carriage C and its related parts. The clutching action possible between heads 36 and extensions 43 is not, however, desirable when the blowpipe is used assembled with a carriage such as described above and suitable means are therefore provided, in the nature of spacers 45, to prevent such clutching action. These spacers are slidably and rotatably mounted on the cross bar 16 and are provided with kerfed ends adapted to straddle the cross bar 35 between the milled ends of head 36 and extension 43.

In order that the runners may be adjusted accurately to a known work condition, as a difference in height between work members to be operated upon, prior to placing the apparatus on the work, the sleeves 26 and elements 18 may be provided with graduations 46 adjacent the slots formed therein, and the lugs 27 and 24 may serve as pointers cooperating with the graduations to indicate the adjustment of the runners R or elements 19 as the case may be. The members on opposite sides of the blowpipe have corresponding graduations and numbered so that relative adjustment of the corresponding members may be readily read from the graduations.

In operation, the runners R may be placed upon the work with their ends in contact therewith, in case the surface of the work is flat, or, in case the work is cylindrical as represented in the drawings, may straddle the work and rest in tangential relation thereto on opposite sides of the blowpipe. In either case, the base or supporting area of the apparatus on the work may be said to comprise the rectangle defined by the points of contact between the runners and the work. In case of the apparatus being supported on a cylindrical surface, it will appear from an inspection of the drawings, that the points of tangential contact between the runners and the work ordinarily lie below the top central line or element of the cylinder and on opposite sides thereof with the plane defined by said line and the axis of the cylinder bisecting or approximately bisecting the angle between the runners.

With the apparatus so mounted on the work, relative travel between the apparatus may be effected by drawing the apparatus over the work toward the operator as in back hand welding when welding on a plane surface or the work may be revolved about its axis with the position of the carriage C held stationary as in girth seam welding, when operating on a cylindrical object. During the relative travel between the apparatus and the work the fluidity of the puddle of molten metal at the welding point may be regulated by raising and lowering the handle H to swing the tips 13 and 14 about the cross bar 35 as an axis and it will be noted that this axis of rotation is behind the welding point and distinct from the points of supporting contact of the runners with the work and is preferably also spaced a distance behind and elevated above the plane defined by these contacts.

It will appear from the foregoing description, that the apparatus of the invention while usable on objects of other contours, is particularly well adapted for use in welding or cutting cylindrical objects, and that the runners which are adapted to straddle such objects are adjustable to rest on such objects in stable equilibrium regardless of their diameters. When used on objects of very small diameter resting near the ground or other support, the runners may be retracted so as not to gouge into the ground or contact with such other support and, when used on objects of greater diameter, may be projected so as to sufficiently straddle the same as to prevent the accidental dislodgement of the carriage therefrom due to manipulation of the blowpipe in controlling the puddle or other movements of the operator's hand by which the handle of the blowpipe is held.

Adjustment of the runners to the work and adjustment of the carriage and blowpipe to the runners and to the work may be made while the carriage is resting on the work so that an operator may judge with his eye as to the amount of adjustment required. Also adjustments of the runners to the work and of the carriage and blowpipe to the runners and to the work may be accomplished without the use of tools in making such adjustments and without necessity of extinguishing the flame before making an adjustment.

As a result of the adjustable connection between the carriage and the runner supports, the pivotal connection between the blowpipe and carriage may be raised or lowered to compensate for any change in elevation thereof due to adjustment of the runners to a work surface or to any other cause and the pivotal connection can, therefore, be always brought to the level at which the welder is accustomed to operate.

It will also appear that the runner supports together with the runners attached thereto can each be adjusted to the carriage independently, whereby the runners on opposite sides of the blowpipe may be adjusted to rest at the same time on objects of different levels.

Necessity for angular adjustment of the runners to adapt the same to curvatures of various diameters is eliminated and fine adjustment of the runners to the carriage and to each other and of the carriage to the work may be accurately accomplished with the apparatus resting on the work or prior to its being placed thereon.

While the improvements disclosed herein are shown as applied to hand operable welding apparatus, it will be understood that they may be incorporated in machine welding apparatus as well as in other types of blowpipe apparatus such as both hand and machine operable gaseous cutting apparatus.

I claim:

1. The combination in welding or cutting apparatus, of heating means for providing welding or cutting heat at a point on work and members connected thereto and positioned in fixed divergent relation to each other so as to be able to straddle an object; said members being adjustable axially so as to adapt them to objects of various diameters.

2. The combination in welding or cutting apparatus, of a blowpipe and members connected with the apparatus for supporting the blowpipe upon objects; said members being connected in pairs and arranged so as to bear a fixed divergent angular relation to each other and being axially adjustable to vary their length from the points of connection with the apparatus.

3. The combination in welding or cutting apparatus, of a blowpipe and members connected thereto and positioned in fixed divergent relation to each other so as to be able to straddle an object; said members being axially adjustable without the use of tools for adapting them to objects of various diameters.

4. The combination in welding or cutting apparatus, of a blowpipe, diverging and axially adjustable means for supporting the blowpipe in stable equilibrium on an object, and means adjustable independently of the supporting means for varying the position of the blowpipe above the object on which the apparatus is supported.

5. The combination in welding or cutting apparatus, of a carriage, a blowpipe supported thereon, and members on the carriage adapted to support the carriage in stable equilibrium on an object; said members being capable of axial adjustment and adapted to be positioned, without other adjustment, on objects of various diameters; and independent means capable of adjusting the entire carriage relative to said members.

6. The combination in welding or cutting apparatus, of a carriage, a blowpipe supported thereon, and members attached to the carriage in divergent relation to each other so as to straddle an object; said members being adjustable to objects of various diameters; and means for adjusting the carriage relative to said members.

7. The combination in welding or cutting apparatus, of a carriage, a blowpipe supported thereby, adjustable members adapted to support the carriage on objects to be operated upon; and means independent of the adjustment of said members capable of adjusting the entire carriage relative to said members to vary the elevation of said carriage.

8. The combination in welding or cutting apparatus, of a carriage, a blowpipe pivoted thereto and supported thereby, runners for supporting the carriage and adjustable to objects of various diameters; and means for adjusting said carriage and blowpipe vertically relative to the runners to vary the elevation of the pivotal axis between the carriage and blowpipe to compensate for variations in elevation due to the adjustment of the runners.

9. The combination in welding or cutting apparatus, of a carriage, a blowpipe pivoted thereto and runners secured in crossed pairs to the carriage and in spaced relation to each other; said runners being adapted for manual adjustment, without the use of tools, so as to straddle objects of various diameters and support the carriage thereon.

10. The combination in welding or cutting apparatus, of a carriage, a blowpipe mounted thereon, and runners arranged in spaced pairs on said carriage; the runners of said pairs being arranged to straddle an object to be operated upon; said pairs of runners being independently adjustable as units relative to the carriage to adapt the runners of the several pairs to different levels of work surface.

11. The combination in welding or cutting apparatus of a carriage, a blowpipe mounted thereon, runners arranged in spaced pairs on said carriage; the runners of said pairs being arranged to straddle an object to be operated upon; said pairs of runners being independently adjustable as units relative to the carriage to adapt the runners of the several pairs to different levels of work surface; the runners of each pair being axially adjustable to adapt the apparatus to curved surfaces of various diameters.

12. The combination in welding or cutting apparatus, of a carriage, a blowpipe mounted thereon, runners arranged in spaced pairs on said carriage; the runners of said pairs being arranged to straddle an object to be operated upon; said pairs of runners being independently adjustable as units relative to the carriage to adapt the runners of the several pairs to different levels of work surface and the runners of each pair being axially adjustable to adapt the apparatus to curved surfaces of various diameters; the adjustments of the individual runners and of the pairs of runners being independent of each other.

13. The combination in welding or cutting apparatus, of a carriage, a blowpipe supported thereon, crossed pairs of runners connected to the carriage, and means for adjusting the length of the runners.

14. The combination in welding or cutting apparatus, of a carriage, a blowpipe pivotally supported thereon, crossed runners for supporting the carriage upon the work being operated upon, and means manually operable while the runners are resting on the work for effecting adjustment of the runners.

WALTER R. LINDEN.